(12) United States Patent
Kobayashi et al.

(10) Patent No.: US 10,994,498 B2
(45) Date of Patent: May 4, 2021

(54) FILAMENT WINDING APPARATUS, FILAMENT WINDING DESIGN METHOD, AND MANUFACTURING METHOD OF TANK

(71) Applicant: TOYOTA JIDOSHA KABUSHIKI KAISHA, Toyota (JP)

(72) Inventors: Tomoyoshi Kobayashi, Toyota (JP); Yuji Hidaka, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 200 days.

(21) Appl. No.: 16/394,714

(22) Filed: Apr. 25, 2019

(65) Prior Publication Data

US 2019/0344512 A1    Nov. 14, 2019

(30) Foreign Application Priority Data

May 10, 2018  (JP) .............................. JP2018-091274

(51) Int. Cl.
*B29C 70/16* (2006.01)
*B65H 57/14* (2006.01)
(Continued)

(52) U.S. Cl.
CPC ............ *B29C 70/16* (2013.01); *B29C 53/602* (2013.01); *B65H 57/14* (2013.01); *B29K 2105/08* (2013.01); *F17C 2209/2154* (2013.01)

(58) Field of Classification Search
CPC ....... B29C 53/602; B29C 53/62; B29C 53/64; B29C 53/665; B29C 53/785; B29C 70/16;
(Continued)

(56) References Cited

U.S. PATENT DOCUMENTS 5,676,330 A * 10/1997 Zhu ...................... B65H 81/08
                                                   220/588
6,782,932 B1 * 8/2004 Reynolds, Jr. ........ B29C 53/665
                                                   156/351
(Continued)

FOREIGN PATENT DOCUMENTS

JP        10-016072      1/1998
JP      2005-113963      4/2005
(Continued)

*Primary Examiner* — Emmanuel M Marcelo
(74) *Attorney, Agent, or Firm* — Finnegan, Henderson, Farabow, Garrett & Dunner, LLP

(57) ABSTRACT

A filament winding apparatus includes: N guide members arranged around a liner having an elongate shape such that the N guide members are centered around a center axis of the liner, the center axis extending in a longitudinal direction of the liner, each of the N guide members being configured to supply one bundle of fibers, and N being an integer equal to or larger than two, a drive unit configured to repeat, W times, a winding operation to helically wind N bundles of fibers supplied respectively from the N guide members around the liner at the same winding angle to form a reinforcing layer, the winding operation being an operation in which each of the N guide members travels, in a direction parallel to the center axis of the liner, from and back to a winding start position, and W being an integer equal to or larger than two.

9 Claims, 6 Drawing Sheets

(51) Int. Cl.
 *B29C 53/60* (2006.01)
 *B29K 105/08* (2006.01)
(58) Field of Classification Search
 CPC ...... B29C 70/32; B29K 2105/08; B65H 7/14; F17C 2209/2154
 See application file for complete search history.

(56) References Cited

U.S. PATENT DOCUMENTS

| | | | |
|---|---|---|---|
| 2005/0077643 A1 | 4/2005 | Matsuoka | |
| 2008/0093367 A1* | 4/2008 | Gilbertson | F17C 1/06 220/592 |
| 2012/0024745 A1* | 2/2012 | Otsuka | B29C 63/24 206/524.3 |
| 2013/0087567 A1* | 4/2013 | Kaneko | F17C 1/06 220/590 |
| 2013/0306783 A1* | 11/2013 | Tanigawa | B65H 57/00 242/476.7 |
| 2014/0263802 A1* | 9/2014 | Tanigawa | B29C 53/602 242/473.6 |
| 2015/0165703 A1* | 6/2015 | Shintani | B29C 53/66 156/172 |
| 2015/0266232 A1* | 9/2015 | Tanigawa | B65H 63/061 242/419.1 |
| 2015/0329315 A1 | 11/2015 | Hatta et al. | |
| 2017/0291352 A1* | 10/2017 | Ueda | B29C 53/562 |
| 2018/0236735 A1* | 8/2018 | Nishibu | B29C 53/8041 |
| 2018/0283609 A1* | 10/2018 | Teruhira | B29C 53/822 |
| 2019/0099937 A1* | 4/2019 | Kono | C08J 5/06 |

FOREIGN PATENT DOCUMENTS

| | | |
|---|---|---|
| JP | 2005-154908 | 6/2005 |
| JP | 2015-217527 | 12/2015 |

* cited by examiner

FILAMENT WINDING APPARATUS, FILAMENT WINDING DESIGN METHOD, AND MANUFACTURING METHOD OF TANK

INCORPORATION BY REFERENCE

The disclosure of Japanese Patent Application No. 2018-091274 filed on May 10, 2018 including the specification, drawings and abstract is incorporated herein by reference in its entirety.

BACKGROUND

1. Technical Field

The disclosure relates to a filament winding apparatus, a filament winding design method, and a manufacturing method of a tank accommodating a fluid.

2. Description of Related Art

A filament winding apparatus disclosed in Japanese Patent Application Publication No. 2005-154908 (JP 2005-154908 A) includes plural yarn-feeding units (guide members). These plural yarn-feeding units are used to wind bundles of fibers around a tank liner or the like, and are arranged at substantially equally-spaced intervals around a member around which the bundles of fibers are wound (a fiber bundle wound member) with a longitudinal axis of the member being a center.

SUMMARY

In the case where the bundles of fibers are wound helically around the liner by using the plural guide members, a rate of covering a liner surface by the bundle of fibers, which is supplied from each of the guide members, is set such that the liner surface is covered with the bundle of fibers supplied from each of the guide members. However, the inventor of the disclosure has found that, in the case where the bundles of fibers are supplied from the plural guide members and are wound helically around the liner, there is a possibility that intended winding is not achieved.

The disclosure can be realized in the following aspects.

(1) According to one aspect of the disclosure, a filament winding apparatus is provided. The filament winding apparatus includes: N guide members arranged around a liner having an elongate shape such that the N guide members are centered around a center axis of the liner, the center axis extending in a longitudinal direction of the liner, each of the N guide members being configured to supply one bundle of fibers, and N being an integer equal to or larger than two; and a drive unit configured to repeat, W times, a winding operation to helically wind N bundles of fibers supplied respectively from the N guide members around the liner at the same winding angle to form a reinforcing layer, the winding operation being an operation in which each of the N guide members travels, in a direction parallel to the center axis of the liner, from and back to a winding start position, and W being an integer equal to or larger than two, W is the number of times that the winding operation is repeated. W is the number of time of the winding operation at a time when a group of numerical values n and a group of numerical values m calculated by a formula (1) to a formula (3) match each other in no particular order: (1) n=L{x} (a function L{x} is a function to take out a fractional portion of x); (2) x=θgM/(360/W); and (3) m=(M−1)/N, where n is a value indicating a first position of each of the bundles of fibers at a time when the N bundles of fibers are wound around the liner for W times, m is a value indicating a second position set such that the N bundles of fibers are equally arranged on the liner, θgM is a relative angle (0°≤θgM<360°) of one of the N guide members around the center axis to an origin (0°) when a position of another of the N guide members is set as the origin (0°), and M is a number assigned to each of the N guide members (M is an integer equal to or larger than one and equal to or smaller than N). According to the filament winding apparatus of this aspect, the bundles of fibers supplied from the N guide members are wound at intended positions on a liner surface. Thus, the intended winding can be performed.

(2) In the filament winding apparatus of the above aspect, the liner may include: a cylindrical section; and two ends that close both of longitudinal ends of the cylindrical section. When a rate of an area of the cylindrical section covered by one of the bundles of fibers with respect to a surface area of the cylindrical section is referred to as a coverage rate of the one bundle of fibers, a sum of the coverage rates of the N bundles of fibers may be set within a range that is equal to or larger than 100% and equal to or smaller than 110%. According to the filament winding apparatus of this aspect, the sum of the coverage rates of the bundles of fibers is equal to or larger than 100% and equal to or smaller than 110%. Thus, the plural bundles of fibers can cover the entire surface of the cylindrical section of the liner.

(3) In the filament winding apparatus of the above aspect, the liner may include: a cylindrical section; and two ends that close both of longitudinal ends of the cylindrical section. When a rate of an area of the cylindrical section covered by one of the bundles of fibers with respect to a surface area of the cylindrical section is referred to as a coverage rate of the one bundle of fibers, a sum of the coverage rates of the N bundles of fibers may be set within a range that is equal to or larger than 75% and smaller than 100%. According to the filament winding apparatus of this aspect, the bundles of fibers supplied from the different guide members can slightly overlap each other in the cylindrical section. In this way, a thickness of the reinforcing layer can be increased without increasing feeding amounts of the bundles of fibers.

(4) In the filament winding apparatus of the above aspect, N indicating the number of the guide members may be any one of integers equal to or larger than two and equal to or smaller than nine. According to the filament winding apparatus of this aspect, an installation time of the guide members and a winding time of the bundles of fibers can be secured in a well-balanced manner, and a manufacturing time of a tank can be shortened.

(5) In the filament winding apparatus of the above aspect, N indicating the number of the guide members may be any one of integers equal to or larger than two and equal to or smaller than four. According to the filament winding apparatus of this aspect, the installation time of the guide members is not excessively increased, and the manufacturing time of the tank can be shortened.

(6) In the filament winding apparatus of the above aspect, the drive unit may cause the N guide members to move in tune of each other. According to the filament winding apparatus of this aspect, control to cause movement of the plural guide members can easily be executed.

(7) In the filament winding apparatus of the above aspect, the relative angle θgM of each of the N guide members may satisfy 0°≤θgM<180°. According to the filament winding apparatus of this aspect, the liner can easily be brought in and out.

The disclosure can also be realized in various aspects other than the above aspects. For example, the disclosure can be realized in aspects of a filament winding design method, a manufacturing method of the tank, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
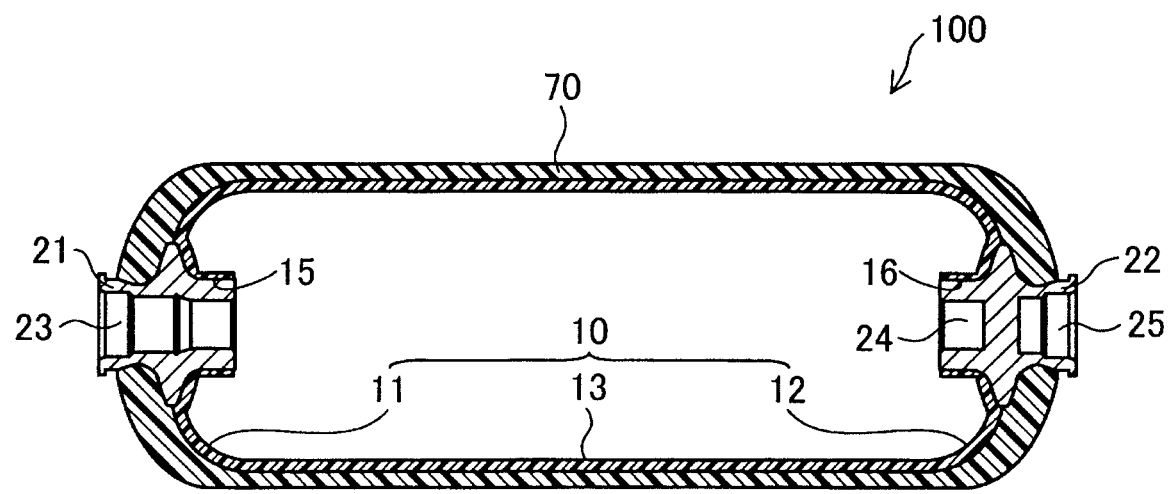
FIG. 1 is a vertical cross-sectional view of a schematic configuration of a tank in an embodiment of the disclosure.

FIG. 1 is a vertical cross-sectional view of a schematic configuration of a tank 100 that is manufactured by a filament winding apparatus according to an embodiment of the disclosure. The tank 100 is a container that accommodates a fluid. The tank 100 is mounted on a fuel cell vehicle, for example, and is used as a high-pressure tank that stores fuel gas.

The tank 100 includes a liner 10, caps 21, 22, and a reinforcing layer 70. The liner 10 is a long hollow body that constitutes an inner layer of the tank 100. In an example shown in FIG. 1, the liner 10 is formed of a hard resin, for example, and includes: a hollow cylindrical section 13; and two substantially semispherical ends 11, 12 that close both of longitudinal ends of the cylindrical section 13. However, each of the ends 11, 12 may not be substantially semispherical. For example, a shape such as a parabolic shape may be adopted for each of the ends 11, 12. The ends 11, 12 have openings 15, 16, respectively. The caps 21, 22 are provided in these openings 15, 16, respectively. The first cap 21 is a substantially cylindrical body that has a through hole 23 penetrating to the inside of the liner 10. The second cap 22 is a substantially cylindrical body that has bottomed recesses 24, 25 at both ends thereof. Each of the caps 21, 22 is formed of metal such as stainless steel, for example. The caps 21, 22 are fixed when being respectively screwed to thread grooves that are provided in the openings 15, 16, for example. The reinforcing layer 70 is an outer layer formed of plural bundles of fibers, which will be described below, and reinforces the liner 10 by covering an entire surface of the liner 10 and parts of the caps 21, 22. The reinforcing layer 70 may be configured to include one layer, or may be configured to include plural layers. The "one layer" is a layer that is formed by the plural bundles of fibers, each of which has the same winding angle. The "winding angle" is an angle of the bundle of fibers with respect to a longitudinal center axis of the liner 10.

Figure 2:
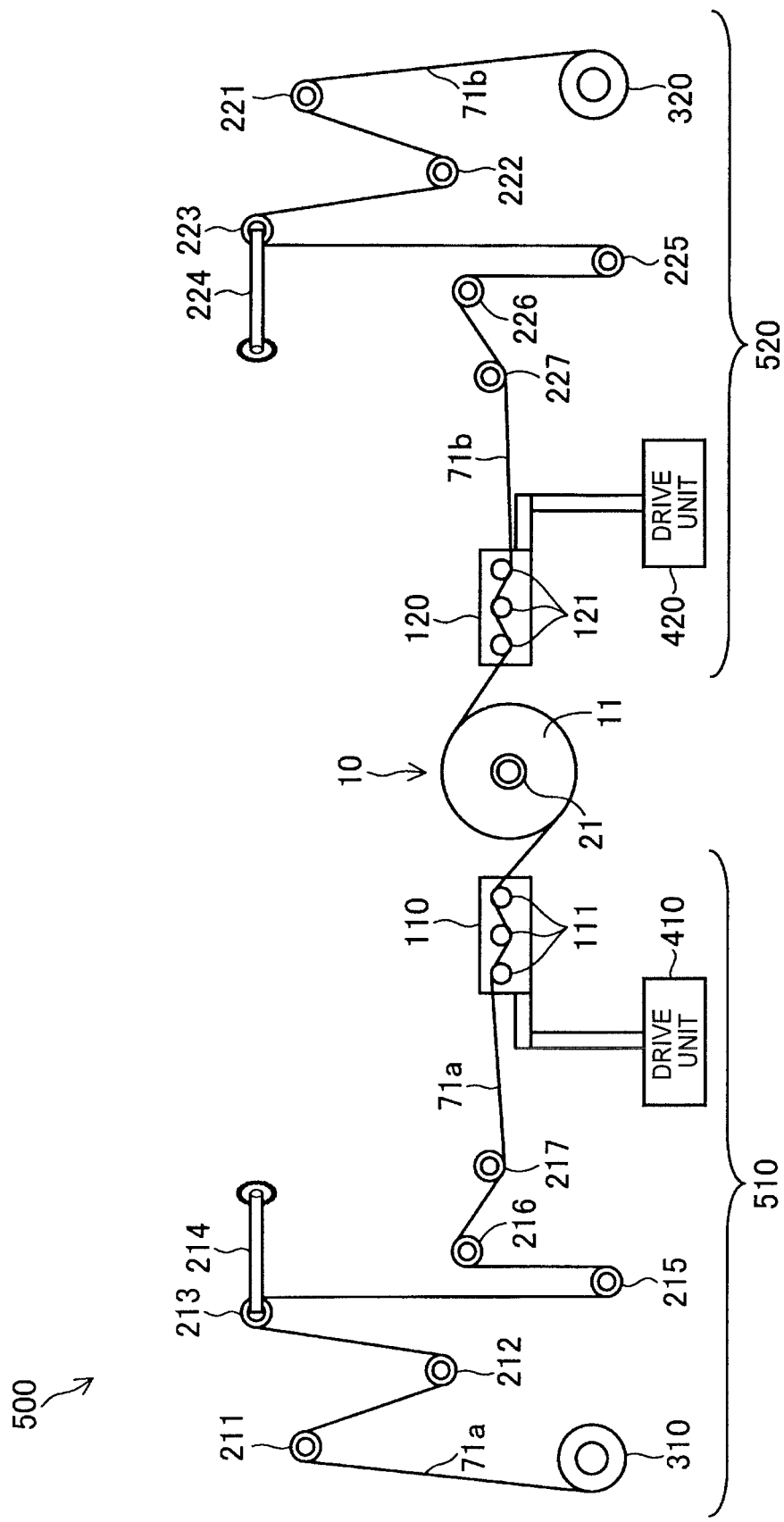
FIG. 2 is a side view of a filament winding apparatus.

FIG. 2 is a side view of a filament winding apparatus 500 (hereinafter referred to as a "FW apparatus 500") according to the embodiment of the disclosure. The FW apparatus 500 is an apparatus that winds the bundles of fibers around the liner 10. The FW apparatus 500 includes a first winding unit 510 and a second winding unit 520. The first winding unit 510 and the second winding unit 520 have the same configurations and are arranged on both sides of the liner 10. Hereinafter, a description will primarily be made on the configuration of the first winding unit 510, and the configuration of the second winding unit 520 will not be described.

The first winding unit 510 includes an unwinding roller 310, conveying rollers 211, 212, a dancer roller 213, conveying rollers 215 to 217, a first guide member 110, and a drive unit 410. One bundle of fibers 71a is wound around the unwinding roller 310 in advance. The unwinding roller 310 is driven to rotate by an electric motor (not shown) and unwinds the bundle of fibers 71a. The unwound bundle of fibers 71a is conveyed to the dancer roller 213 by the conveying rollers 211, 212. The dancer roller 213 moves vertically in accordance with rotation of a dancer arm 214 so as to regulate a tensile force of the bundle of fibers 71a. The bundle of fibers 71a, the tensile force of which is regulated, is conveyed to the first guide member 110 by the conveying rollers 215 to 217. The first guide member 110 is a member that supplies the one bundle of fibers 71a and winds the bundle of fibers 71a around the liner 10. The first guide member 110 is a hollow box-shaped body. In the first guide member 110, plural conveying rollers 111 used to convey the bundle of fibers 71a are provided. The drive unit 410 controls winding operation of the first guide member 110. The drive unit 410 repeats winding, in which the first guide member 110 reciprocates once in parallel with the longitudinal center axis of the liner 10 from a winding start position, for plural times.

The second winding unit 520 includes an unwinding roller 320, conveying rollers 221, 222, a dancer roller 223, conveying rollers 225 to 227, a second guide member 120, and a drive unit 420. One bundle of fibers 71b is wound around the unwinding roller 320 in advance. In the second guide member 120, plural conveying rollers 121 used to convey the bundle of fibers 71b are provided. The bundle of fibers 71b, which is conveyed by the second guide member 120, is wound around the liner 10 by the second guide member 120. The drive unit 420 controls winding operation of the second guide member 120. The FW apparatus 500 may include three or more winding units.

Figure 3:
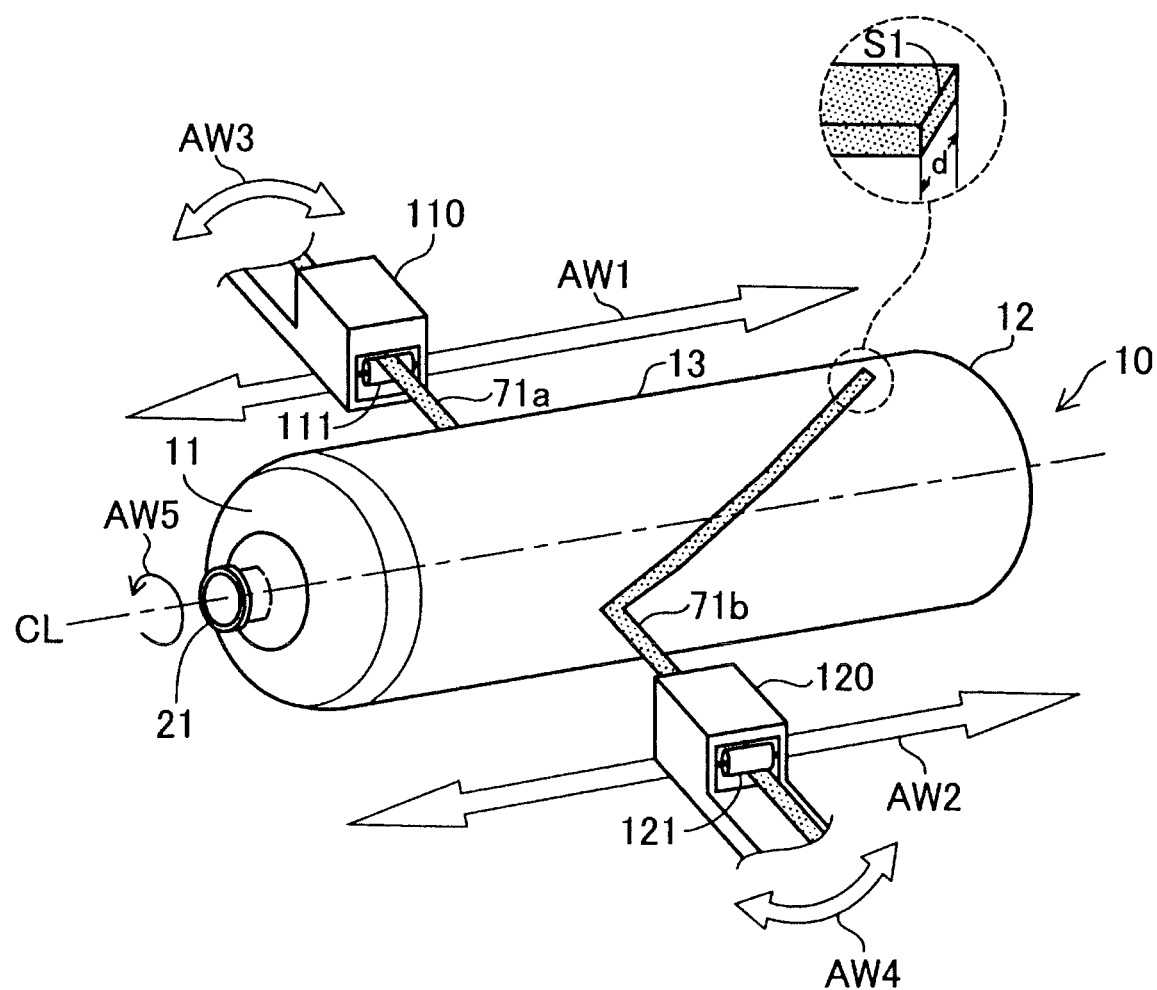
FIG. 3 is a view schematically showing operation of a liner and guide members at the time of winding bundles of fibers.

FIG. 3 is an enlarged perspective view of the liner 10 shown in FIG. 2, and is an explanatory view that schematically shows positional relationships among the liner 10 and the guide members 110, 120 and operation at the time of winding the bundles of fibers. The guide members 110, 120 are arranged to oppose each other with a longitudinal center axis CL of the liner 10 being interposed therebetween. That is, when seen from a direction of the center axis CL of the liner 10, the guide members 110, 120 are arranged at equally-spaced intervals around the liner 10 with the center axis CL of the liner 10 being a center. The guide members 110, 120 can respectively reciprocate in directions of arrows AW1, AW2 that are parallel directions with the center axis CL of the liner 10. The guide members 110, 120 themselves can respectively swing in directions of arrows AW3, AW4.

The thread groove, which is not shown, is formed in the recess 24 (FIG. 1) of the second cap 22 of the liner 10, and a rotatable rotation rod (not shown) is inserted from the through hole 23 (FIG. 1) of the first cap 21 and is fixed to the recess 24 by screwing. The rotation rod serves as the center axis CL of the liner 10. A support rod (not shown) is inserted in the recess 25 (FIG. 1) of the second cap 22. The liner 10 can rotate in a direction of an arrow AW5 with the rotation rod being a rotational axis while being supported by the support rod.

Each of the bundles of fibers 71a, 71b is formed by bundling plural fibers that are impregnated with an uncured thermosetting resin. For example, a bundle of carbon-fiber-reinforced plastic (CFRP), in which carbon fibers are impregnated with a thermosetting epoxy resin, can be adopted. Each of the bundles of fibers 71a, 71b is formed in a tape shape. A width d of each of the bundles of fibers 71a, 71b corresponds to a width of a short side S1 of each of the bundles of fibers 71a, 71b. The widths d of the bundles of fibers 71a, 71b are set to be the same. However, the widths d of the bundles of fibers 71a, 71b may differ. Before the winding of the bundles of fibers around the liner 10 is started, one end of each of the bundles of fibers 71a, 71b is fixed to the liner 10.

In an example shown in FIG. 3, when the winding of the bundles of fibers around the liner 10 is started, the liner 10 rotates along the direction of the arrow AW5 in conjunction with rotation of the rotation rod. While supplying the bundles of fibers 71a, 71b to the liner 10, respectively, the guide members 110, 120 reciprocate and move in parallel with the center axis CL in tune with the directions of the arrows AW1, AW2 by the control of the drive units 410, 420 (FIG. 2). As a result, the bundles of fibers 71a, 71b are helically wound around the liner 10 at the same winding angle. "Helically wound" means that each of the bundles of fibers 71a, 71b is wound such that the winding angle thereof is larger than 0 and smaller than 90 degrees. In the example shown in FIG. 3, the bundles of fibers 71a, 71b in the widths d form the reinforcing layer 70 (FIG. 1) that covers an entire outer circumference around the center axis CL of the liner 10. Here, a single reciprocation cycle of each of the guide members 110, 120 in parallel with the center axis CL of the liner 10 from the winding start position will be referred to as single winding. When the first guide member 110 performs the single winding, the bundle of fibers 71a is wound once around a surface of each of the ends 11, 12 of the liner 10. Similarly, when the second guide member 120 performs the single winding, the bundle of fibers 71b is wound once around the surface of each of the ends 11, 12. Note that, since the entire surface of the liner 10 is covered by using the two bundles of fiber 71a, 71b, it is preferred to set a sum of rates (hereinafter referred to as "coverage rates") of areas of the cylindrical section 13 of the liner 10 covered by the bundles of fibers 71a, 71b with respect to a surface area of the cylindrical section 13 at 100%. In the example shown in FIG. 3, the coverage rate of the bundle of fibers 71a is set at 50%, and the coverage rate of the bundle of fibers 71b is set at 50%.

Figure 4:
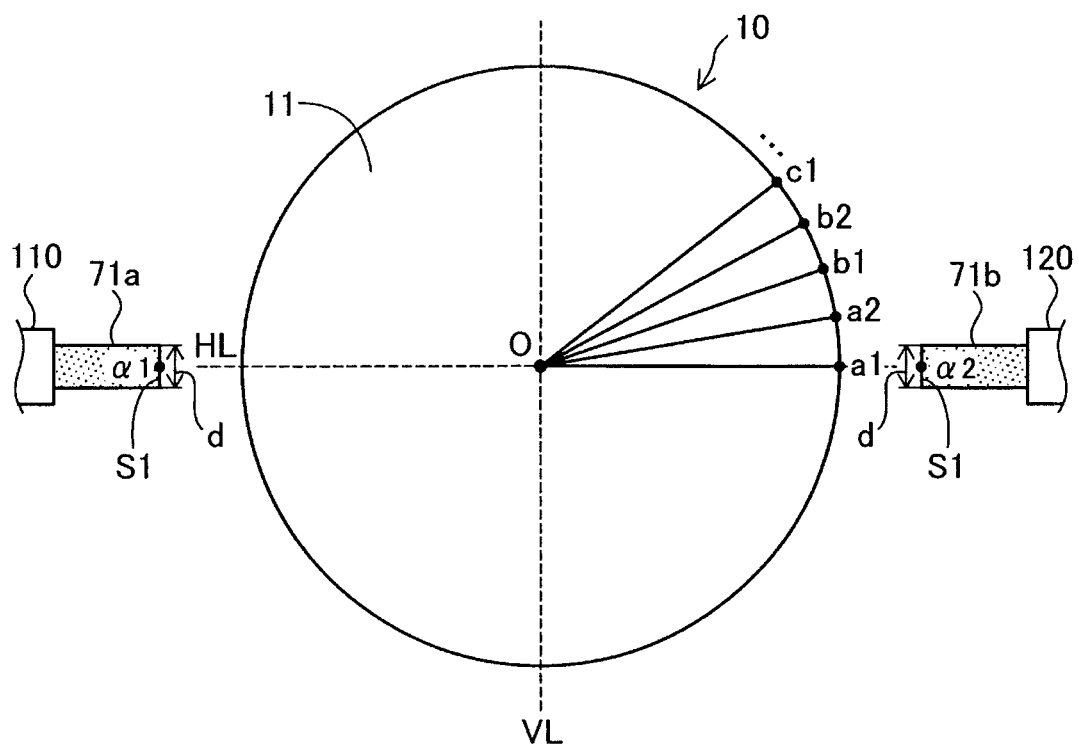
FIG. 4 is a view of assumed positions where the bundles of fibers are wound around the liner.

FIG. 4 is a plan view that is seen from the end 11 side of the liner 10 shown in FIG. 3, and is a view of assumed positions m (second positions m) of the bundles of fibers 71a, 71b on the liner 10. The "assumed positions m (the second positions m)" are positions determined such that the bundle of fibers supplied from each of the guide members is equally arranged when the bundles of fibers are wound around the liner 10 by using the plural guide members. "Equally arranged" means that plural bundles of fibers 71a, 71b are arranged such that centers thereof do not overlap each other on points, which equally divide an outer circumference of the end 11 of the liner 10 into plural parts. For convenience of the illustration, the cap 21 is not shown, and the guide members 110, 120 are shown in a simplified manner. For convenience of the description, a center O that the center axis CL of the liner 10 passes is shown, and a horizontal axis HL and a vertical axis VL, each of which passes the center O and which are perpendicular to each other, are shown.

In an example shown in FIG. 4, the assumed positions m of the bundles of fibers 71a, 71b, which are respectively supplied from the two guide members 110, 120, are represented by points a1, a2, b1, b2, c1 . . . that equally divide the outer circumference of the end 11 of the liner 10 into the plural parts. Of these plural points a1, a2, b1, b2, c1 . . . , the points a1, b1, c1 . . . represent the assumed positions m of the bundle of fibers 71a, and the points a2, b2 . . . represent the assumed positions m of the bundle of fibers 71b. The assumed positions m of the bundles of fibers 71a, 71b shown in FIG. 4 are the assumed positions m of the case where the coverage rate of each of the bundles of fibers 71a, 71b is 50% and the sum of coverage rate is 100%, that is, the case where the bundles of fibers 71a, 71b on the cylindrical section 13 of the liner 10 do not overlap each other and cover the entire surface of the liner 10 with hardly any clearance.

The number of winding W by each of the guide members 110, 120 is set such that actual positions n (first positions n) of the bundles of fibers 71a, 71b match the assumed positions m thereof when the bundles of fibers 71a, 71b, which are respectively supplied from the two guide members 110, 120, are wound around the liner 10 for the number of winding W. In the example shown in FIG. 4, the number of winding W by each of the guide members 110, 120 is set such that a midpoint α1 of the short side S1 of the bundle of fibers 71a overlaps the points a1, b1, c1 . . . and a midpoint α2 of the short side S1 of the bundle of fibers 71b overlaps the points a2, b2 . . . when the bundles of fibers 71a, 71b are wound. The description has been made on the assumed positions m of the bundles of fibers 71a, 71b at the end 11 of the liner 10 with reference to FIG. 4. Also, on the cylindrical section 13 (FIG. 3) of the liner 10, the assumed positions m that correspond to the points a1, a2, b1, b2, c1 . . . are set, and the actual positions n of the bundles of fibers 71a, 71b on the cylindrical section 13 are set to match the assumed positions m thereof.

Here, the assumed position m and the actual position n can be expressed by a formula (1), a formula (2), and a formula (3).

$$n = L\{x\} \text{ (a function } L\{x\} \text{ is a function to take out a fractional portion of } x\text{)} \tag{1}$$

$$x = \theta g M / (360/W) \tag{2}$$

$$m = (M-1)/N \tag{3}$$

N: the number of the guide members 110, 120 (N is an integer equal to or larger than 2.)
M: a number assigned to each of the guide members 110, 120 (M is an integer equal to or larger than 1 and equal to or smaller than N.)
θgM: a relative angle (0°≤θgM<360°) of the one guide member 120 (110) around the center axis CL to an origin when the position of the other guide member 110 (120) of the guide members 110, 120 is set as the origin (0°).
W: the number of winding of each of the guide members 110, 120

As the appropriate number of winding W, with which the assumed positions m of the bundles of fibers 71a, 71b respectively supplied from the guide members 110, 120 match the actual positions n at the time when the bundles of fibers are wound around the liner 10 by using the two guide members 110, 120, 19 is used. Such an example will be described below. When the number N of the guide members 110, 120 is set to 2, and the number of winding W is set to 19, the following calculation result of the assumed positions m and the actual positions n is obtained. Here, when the number M of the guide member 110 is set to 1 and the relative angle θgM is set at 0°, a result (1) is obtained. When the number M of the guide member 110 is set to 2 and the relative angle θgM is set at 0°, a result (2) is obtained.

Result (1) The guide member 110: number M=1, the relative angle θgM=0°

The guide member 120: number M=2, the relative angle θgM=180°

The bundle of fibers 71a: the assumed position m=0, the actual position n=0

The bundle of fibers 71b: the assumed position m=0.5, the actual position n=0.5

Result (2) The guide member 110: number M=2, the relative angle θgM=0°

The guide member 120: number M=1, the relative angle θgM=180°

The bundle of fibers 71a: the assumed position m=0.5, the actual position n=0

The bundle of fibers 71b: the assumed position m=0, the actual position n=0.5

As it is understood from these results, when the two guide members 110, 120 are used, and the number of winding W is set to 19, the actual position n of the bundle of fibers 71a, which is supplied from the guide member 110, matches the assumed position m thereof, and the actual position n of the bundle of fibers 71b, which is supplied from the guide member 120, matches the assumed position m thereof. Alternatively, the actual position n of the bundle of fibers 71a, which is supplied from the guide member 110, matches the assumed position m of the bundle of fibers 71b, which is supplied from the guide member 120, and the actual position n of the bundle of fibers 71b, which is supplied from the guide member 120, matches the assumed position m of the bundle of fibers 71a, which is supplied from the guide member 110. In other words, when the two guide members 110, 120 are used, and the number of winding W is set to 19, the bundle of fibers 71a and the bundle of fibers 71b, which are respectively supplied from the guide members 110, 120, do not overlap each other on the cylindrical section 13 of the liner 10 and can cover the entire surface of the liner 10 with hardly any clearance.

Meanwhile, as the number of winding W, with which the assumed positions m of the bundles of fibers 71a, 71b respectively supplied from the two guide members 110, 120 do not match the actual positions n thereof, 18 is used. Such a comparative example will be described below. When the number N of the guide members 110, 120 is set to 2, and the number of winding W is set to 18, the following calculation result the assumed positions m and the actual positions n is obtained. Here, in the case where the number M of the guide member 110 is set to 1 and the relative angle θgM is set at 0°, a result (3) is acquired. Here, when the number M of the guide member 110 is set to 1 and the relative angle θgM is set at 0°, a result (3) is obtained. When the number M of the guide member 110 is set to 2 and the relative angle θgM is set at 0°, a result (4) is obtained.

Result (3) The guide member 110: number M=1, the relative angle θgM=0°

The guide member 120: number M=2, the relative angle θgM=180°

The bundle of fibers 71a: the assumed position m=0, the actual position n=0

The bundle of fibers 71b: the assumed position m=0.5, the actual position n=0

Result (4) The guide member 110: number M=1, the relative angle θgM=0°

The guide member 120: number M=2, the relative angle θgM=180°

The bundle of fibers 71a: the assumed position m=0.5, the actual position n=0

The bundle of fibers 71b: the assumed position m=0, the actual position n=0

As it is understood from these results, when the two guide members 110, 120 are used, and the number of winding W is set to 18, the actual positions n of the bundles of fibers 71a, 71b are 0 and thus are the same. As a result, the bundle of fibers 71a and the bundle of fibers 71b are wound at the same position, and the bundle of fibers 71a and the bundle of fibers 71b entirely overlap each other. Thus, it is impossible to cover the entire surface of the liner 10 with hardly any clearance.

As it is understood from the description so far, the number of winding W is the number of winding at the time when a group of numerical values n and a group of numerical values m calculated by the formula (1) to the formula (3) match each other in no particular order. Note that the assumed position m may have a slight allowable range. As an example, in the case where there is an error in the width d of each of the bundles of fibers 71a, 71b, that is, the width of each of the bundles of fibers 71a, 71b actually used for the winding is d1 (d1>d), an assumed position m1 can be expressed by a formula (4) and a formula (5).

$$m1 = m \pm To \quad (4)$$

$$To = [\arctan(d1/D \times \cos \beta) - \arctan(d/D \times \cos \beta)]/(360/W) \quad (5)$$

To: a value that determines the allowable range of the assumed position m

D: a diameter of the liner 10

β: the winding angle

W: the number of winding of each of the guide members 110, 120

At this time, the actual position n may slightly deviate in accordance with the assumed position m1. As a calculation method of the value To that determines the allowable range, it is first assumed that the one bundle of fibers 71a in the width d with no error is wound around the liner 10. At this time, a length of a cross section of the fiber bundle 71a, which is obtained by cutting the cylindrical section 13 of the liner 10 in a perpendicular direction to the center axis CL of the liner 10, is (d/cos β), and a center angle that is defined by both longitudinal ends of the cross section and the center O of the liner 10 is set as 2γ. In such a case, tan γ=d/(cos β×D) is established. Meanwhile, when the one fiber bundle 71a in the width d1 with the error is wound around the liner 10, the center angle is changed to γ1. Also, at this time, tan γ1=d1/(cos β×D) is established. Thus, the value To that determines the allowable range can be calculated by using (γ1−γ) as deviation of the center angle.

Figure 5:
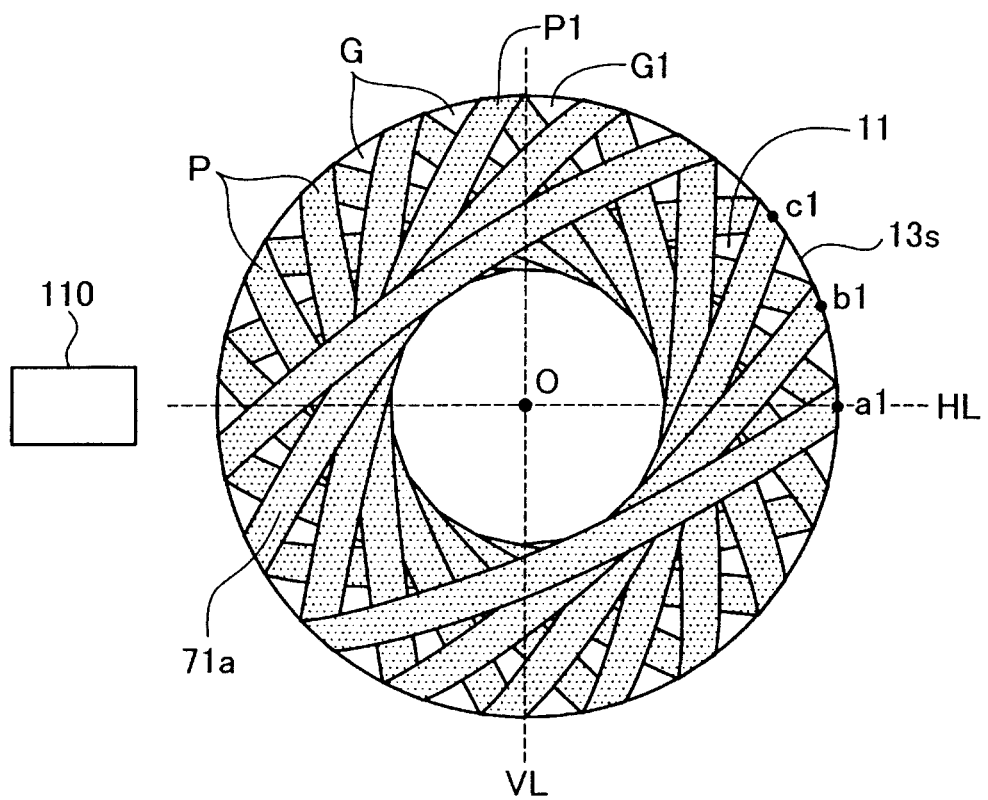
FIG. 5 is a view of a winding result by the one bundle of fibers.
Figure 6:
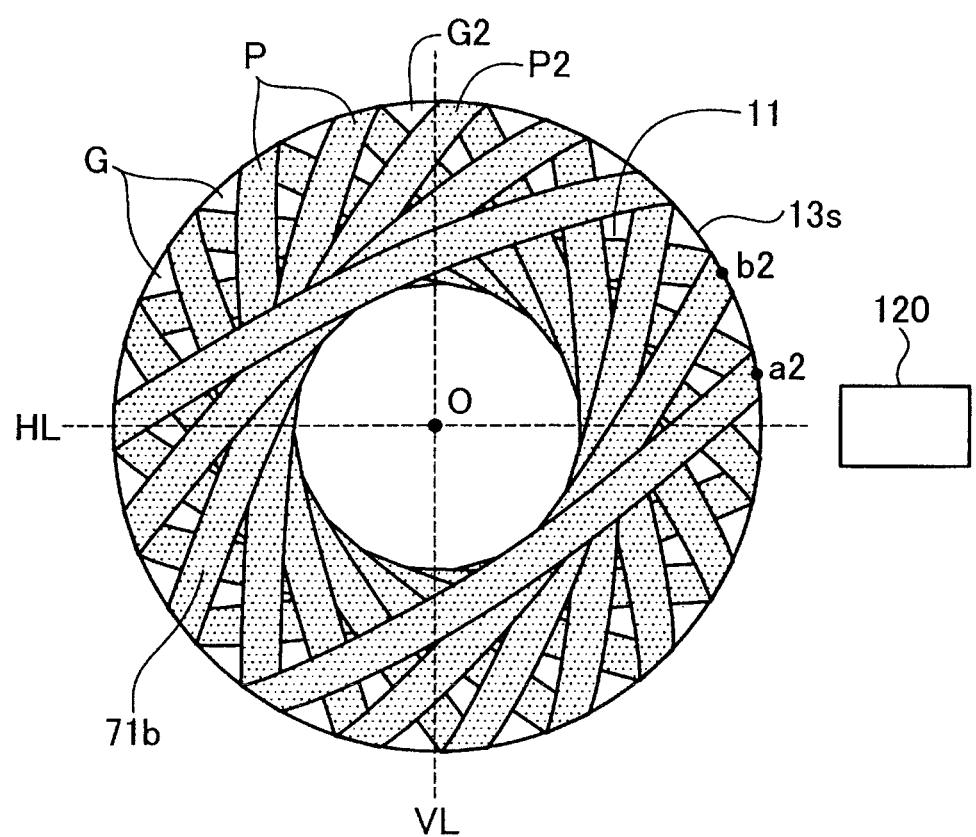
FIG. 6 is a view of a winding result by the other bundle of fibers.
Figure 7:
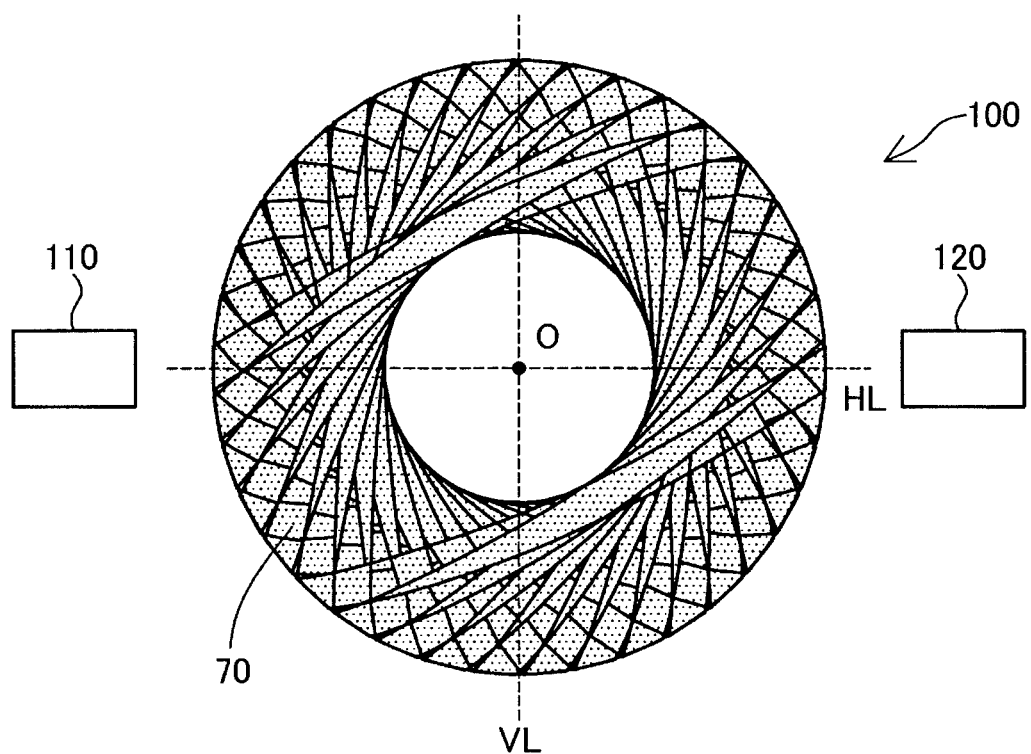
FIG. 7 is a view of a winding result by the plural bundles of fibers.

FIG. 5 and FIG. 6 are views of winding results of the bundles of fibers 71a, 71b, respectively, at the time when, as described in the example shown in FIG. 4, the two guide members 110, 120 are used, the number of winding W is set to 19, and the bundles of fibers 71a, 71b are actually wound around the liner 10. In an example shown in FIG. 5, the bundle of fibers 71a is wound such that the midpoint ca1 (FIG. 4) of the short side S1 of the bundle of fibers 71a overlaps the points a1, b1, c1 . . . representing the assumed positions m of the bundle of fibers 71a. In an example shown in FIG. 6, the bundle of fibers 71b is wound such that the midpoint c2 (FIG. 4) of the short side S1 of the bundle of fibers 71b overlaps the points a2, b2 . . . representing the assumed positions m of the bundle of fibers 71b. FIG. 7 is a view showing a result of actually winding the bundles of fibers 71a, 71b around the liner 10, and is a view in which FIG. 5 and FIG. 6 are superimposed.

In examples shown in FIG. 5, FIG. 6, and FIG. 7, each of the bundles of fibers 71a, 71b is wound around the end 11 of the liner 10 for 19 times. Here, in order to facilitate understanding, a description will be made on a distribution situation of the bundles of fibers 71a, 71b on the cylindrical section 13 with reference to a distribution situation of the bundles of fibers 71a, 71b at a circumferential edge of the end 11, that is, a boundary 13s between the end 11 and the cylindrical section 13 (FIG. 3). At the circumferential edge of the end 11, a clearance G where the bundle of fibers 71a (or the bundle of fibers 71b) is not wound exists between crossing sections P of the bundle of fibers 71a (or the bundle of fibers 71b) that is arbitrarily wound twice. The 19 crossing sections P are distributed at equally-spaced intervals on the circumferential edge of the end 11, and the crossing sections P are not point-symmetric to the center O. In addition, since the guide members 110, 120 are arranged around the liner 10 at a 180-degree pitch, a position of each of the crossing sections P of the bundle of fibers 71b rotates 180 degrees from a position of corresponding one of the crossing sections P of the bundle of fibers 71a with the center O being the center. Thus, a crossing section P1 of the bundle of fibers 71a overlaps a clearance G2 that is adjacent to a crossing section P2 of the bundle of fibers 71b, and the crossing section P2 of the bundle of fibers 71b overlaps a clearance G1 that is adjacent to the crossing section P1 of the bundle of fibers 71a. The same applies to the other crossing sections P and the other clearances G. As a result, the cylindrical section 13 is covered with the bundles of fibers 71a, 71b with hardly any clearance, and the ends 11, 12 and the boundaries 13s are also covered with the bundles of fibers 71a, 71b. In this way, as shown in FIG. 7, the tank 100 having the reinforcing layer 70, which is formed of the bundle of fibers 71a and the bundle of fibers 71b, is obtained.

Figure 8:
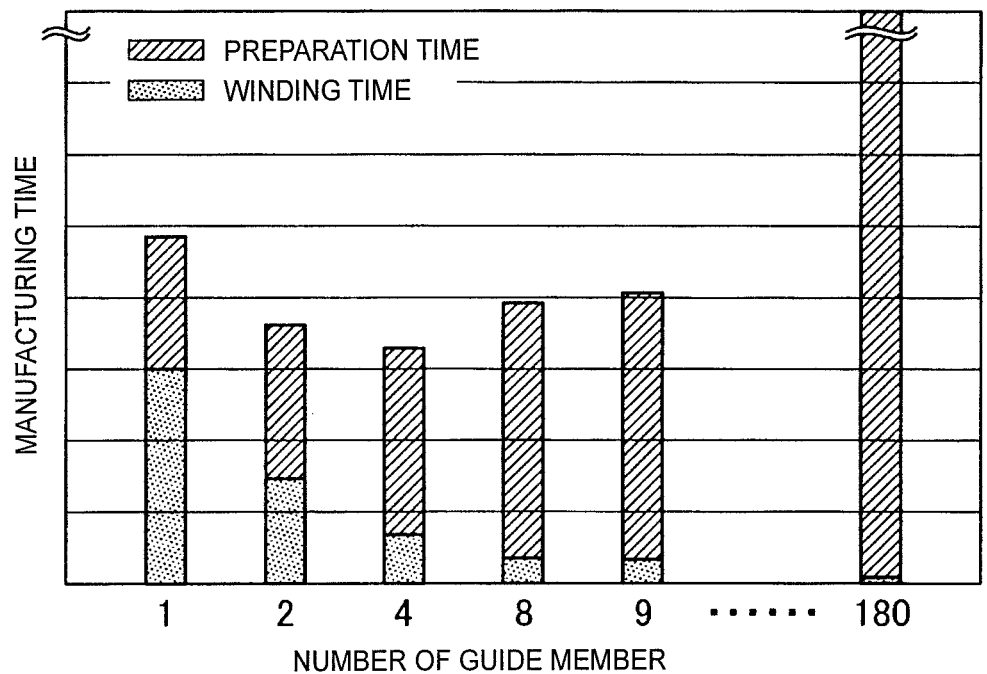
FIG. 8 is a graph showing a relationship between the number of the guide members and a manufacturing time.

FIG. 8 is a graph showing a relationship between the number of the guide members and a manufacturing time in the case where the single reinforcing layer 70 (FIG. 1) is formed on the same liner 10 (FIG. 1) to manufacture the tank 100 (FIG. 1). Each hatched bar graph represents a preparation time, such as an installation time of the guide members, other than a winding time of the bundles of fibers around the liner 10. Each dotted bar graph represents the winding time of the bundles of fibers around the liner 10. According to FIG. 8, as the number of the guide members is increased, the winding time is decreased, and the preparation time is increased. Thus, the number of the guide members is preferably set to be equal to or larger than 2 and equal to or smaller than 9. In this way, the installation time of the guide members and the winding time of the bundles of fibers can be secured in a well-balanced manner, and the manufacturing time of the tank 100 can be shortened. In addition, the number of the guide members is further preferably set to be equal to or larger than 2 and equal to or smaller than 4. In this way, the installation time of the guide members is not excessively increased, and the manufacturing time of the tank 100 can be shortened.

As it has been described so far, in the embodiment of the disclosure, the number of winding W is set such that, when the bundles of fibers are wound around the liner 10 by using the two guide members 110, 120, the actual positions n of the bundles of fibers 71a, 71b, which are respectively supplied from the guide members 110, 120, match the assumed positions m thereof. The assumed positions m are set such that the bundles of fibers 71a, 71b, which are respectively supplied from the guide members 110, 120, are equally arranged on the liner 10. When a process, in which the one guide 15' member supplying the one bundle of fibers is used to wind the one bundle of fibers around the surface of the liner 10 to cover the surface, is shared by the plural guide members, depending on the number of winding W, there is a case where the bundles of fibers supplied from the different guide members unintentionally overlap each other and an unintentional part that is not covered with the bundle of fibers is produced on the surface of the liner 10. However, as in the embodiment, when the number of winding W is set such that the actual positions n of the bundles of fibers 71a, 71b, which are respectively supplied from the two guide members 110, 120, match the assumed positions m thereof, it is possible to prevent the bundle of fibers 71a and the bundle of fibers 71b from unintentionally overlapping each other. As a result, the intended winding can be performed.

Note that, when the error of the width d of each of the bundles of fibers 71a, 71b is taken into consideration, a sum of the coverage rates of the bundles of fibers 71a, 71b may be larger than 100% and equal to or smaller than 110%. In such a case, the bundles of fibers 71a, 71b can cover the surface of the liner 10 with hardly any clearance. However, the sum of the coverage rates of the bundles of fibers 71a, 71b may be equal to or larger than 75% and smaller than 100%. In such a case, the bundles of fibers 71a, 71b may slightly overlap each other on the cylindrical section 13 of the liner 10. In this way, a thickness of the reinforcing layer 70 can be increased without increasing feeding amounts of the bundles of fibers 71a, 71b.

OTHER EMBODIMENTS

The disclosure is not limited to the examples and the embodiment described above, but can be implemented in various aspects within the scope that does not depart from the gist thereof, and the following embodiments can also be implemented, for example.

First Other Embodiment

In the embodiment that has been described above, the guide members 110, 120 are arranged at the equally-spaced intervals around the liner 10 with the center axis CL of the liner 10 being the center. However, the guide members 110, 120 may be arranged at unequally-spaced intervals around the liner 10. However, in the case where the guide members 110, 120 are arranged at the equally-spaced intervals around the liner 10 with the center axis CL of the liner 10 being the center, a winding speed of each of the bundles of fibers 71a, 71b can be increased. In addition, the relative angle θgM of each of the guide members 110, 120 may be set to satisfy 0°≤θgM<180°. For example, when the relative angle θgM of the first guide member 110 is set at 0°, the relative angle θgM of the second guide member 120 may be set at 90°. In such a case, the guide members 110, 120 are arranged around the liner 10 in such a manner as not to be excessively diverged. As a result, the liner 10 can easily be brought in and out.

Second Other Embodiment

In the embodiment that has been described above, the drive units 410, 420 cause the two guide members 110, 120 to move in tune of each other. However, the drive units 410, 420 may cause the two guide members 110, 120 to move separately to wind the bundles of fibers 71a, 71b. However, in the case where the two guide members 110, 120 move in tune of each other, the bundles of fibers 71a, 71b can be wound by the simple control.

Third Other Embodiment

As the appropriate number of winding W, with which the assumed positions m of the bundles of fibers supplied from the guide members match the actual positions n at the time when the bundles of fibers are wound around the liner 10 by using the three guide members, 14 is used. Such an example will be described below. When the number N of the guide members is set to 3, and the number of winding W is set to 14, the following calculation result the assumed positions m and the actual positions n is obtained. Here, the relative angle θgM of the guide member with the number M being 1 is set at 0°, the relative angle θgM of the guide member with the number M being 2 is set at 120°, and the relative angle θgM of the guide member with the number M being 3 is set at 240°.

Result (5) The guide member: number M=1, the relative angle θgM=0°

The bundle of fibers: the assumed position m=0, the actual position n=0

The guide member: number M=2, the relative angle θgM=120°

The bundle of fibers: the assumed position m=0.333 . . . , the actual position n=0.666 . . . .

The guide member: number M=3, the relative angle θgM=240°

The bundle of fibers: the assumed position m=0.666 . . . , the actual position n=0.333 . . . .

As it is understood from these results, when the three guide members are used, and the number of winding W is set to 14, each of the actual positions n of the bundles of fibers supplied from the guide members matches any of the assumed positions m.

Fourth Other Embodiment

As the appropriate number of winding W, with which the assumed positions m of the bundles of fibers supplied from the guide members match the actual positions n at the time when the bundles of fibers are wound around the liner 10 by using the four guide members, 9 is used. Such an example will be described below. When the number N of the guide members is set to 4, and the number of winding W is set to 9, the following calculation result the assumed positions m and the actual positions n is obtained. Here, the relative angle θgM of the guide member with the number M being 1 is set at 0°, the relative angle θgM of the guide member with the number M being 2 is set at 90°, the relative angle θgM of the guide member with the number M being 3 is set at 180°, and the relative angle θgM of the guide member with the number M being 4 is set at 270°.

Result (6) The guide member: number M=1, the relative angle θgM=0°

The bundle of fibers: the assumed position m=0, the actual position n=0

The guide member: number M=2, the relative angle θgM=90°

The bundle of fibers: the assumed position m=0.25, the actual position n=0.25

The guide member: number M=3, the relative angle θgM=180°

The bundle of fibers: the assumed position m=0.5, the actual position n=0.5

The guide member: number M=4, the relative angle θgM=270°

The bundle of fibers: the assumed position m=0.75, the actual position n=0.75

As it is understood from these results, when the four guide members are used, and the number of winding W is set to 9, the assumed positions m of the bundles of fibers supplied from the guide members match the actual positions n thereof.

The disclosure is not limited to the above-described embodiment and can be implemented by having any of various configurations within the scope that does not depart from the gist thereof. For example, technical features in the embodiment that correspond to technical features in the aspects described in SUMMARY can appropriately be replaced or combined to solve a part or the whole of the above-described problem or to achieve some or all of the above-described effects. In addition, when any of those technical features is not described as being essential in the present specification, the technical feature(s) can appropriately be eliminated.

What is claimed is:

1. A filament winding apparatus comprising:
N guide members arranged around a liner having an elongate shape such that the N guide members are centered around a center axis of the liner, the center axis extending in a longitudinal direction of the liner, each of the N guide members being configured to supply one bundle of fibers, and N being an integer equal to or larger than two; and
a drive unit configured to repeat, W times, a winding operation to helically wind N bundles of fibers supplied respectively from the N guide members around the liner at the same winding angle to form a reinforcing layer, the winding operation being an operation in which each of the N guide members travels, in a direction parallel to the center axis of the liner, from and back to a winding start position, and W being an integer equal to or larger than two, wherein
W is the number of time of the winding operation at a time when a group of numerical values n and a group of numerical values m calculated by a formula (1) to a formula (3) match each other in no particular order, $$n = L\{x\}, \text{ a function } L\{x\} \text{ is a function to take out a fractional portion of } x, \quad (1)$$

$$x = \theta g M / (360/W) \quad (2)$$

$$m = (M-1)/N, \text{ where} \quad (3)$$

n is a value indicating a first position of each of the bundles of fibers at a time when the N bundles of fibers are wound around the liner for W times,
m is a value indicating a second position set such that the N bundles of fibers are equally arranged on the liner, θgM is a relative angle (0°≤θgM<360°) of one of the N guide members around the center axis to an origin (0°) when a position of another of the N guide members is set as the origin (0°), and M is a number assigned to each of the N guide members, M being an integer equal to or larger than one and equal to or smaller than N.

2. The filament winding apparatus according to claim 1, wherein the liner includes: a cylindrical section; and two ends that close both of longitudinal ends of the cylindrical section, and when a rate of an area of the cylindrical section covered by one of the bundles of fibers with respect to a surface area of the cylindrical section is referred to as a coverage rate of the one bundle of fibers, a sum of the coverage rates of the N bundles of fibers is set within a range that is equal to or larger than 100% and equal to or smaller than 110%.

3. The filament winding apparatus according to claim 1, wherein the liner includes: a cylindrical section; and two ends that close both of longitudinal ends of the cylindrical section, and when a rate of an area of the cylindrical section covered by one of the bundles of fibers with respect to a surface area of the cylindrical section is referred to as a coverage rate of the one bundle of fibers, a sum of the coverage rates of the N bundles of fibers is set within a range that is equal to or larger than 75% and smaller than 100%.

4. The filament winding apparatus according to claim 1, wherein

N indicating the number of the guide members is any one of integers equal to or larger than two and equal to or smaller than nine.

5. The filament winding apparatus according to claim 1, wherein

N indicating the number of the guide members is any one of integers equal to or larger than two and equal to or smaller than four.

6. The filament winding apparatus according to claim 1, wherein the drive unit is configured to cause the N guide members to move in tune of each other.

7. The filament winding apparatus according to claim 1, wherein the relative angle θgM of each of the N guide members satisfies 0°≤θgM<180°.

8. A manufacturing method of a tank accommodating a fluid comprising:

preparing a liner having an elongate shape; and repeating, W times, a winding operation to helically wind N bundles of fibers supplied respectively from N guide members around the liner at the same winding angle to form a reinforcing layer, the N guide members being centered around a center axis of the liner, the center axis extending in a longitudinal direction of the liner, each of the N guide members being configured to supply one bundle of fibers, and N being an integer equal to or larger than two, the winding operation being an operation in which each of the N guide members travels, in a direction parallel to the center axis of the liner, from and back to a winding start position, and W being an integer equal to or larger than two, wherein W is the number of times that the winding operation is repeated, W is the number of time of the winding operation at a time when a group of numerical values n and a group of numerical values m calculated by a formula (1) to a formula (3) match each other in no particular order, $$n = L\{x\}, \text{ a function } L\{x\} \text{ is a function to take out a fractional portion of } x, \quad (1)$$

$$x = \theta gM/(360/W) \quad (2)$$

$$m = (M-1)/N, \text{ where} \quad (3)$$

n is a value indicating a first position of each of the bundles of fibers at a time when the N bundles of fibers are wound around the liner for W times, m is a value indicating a second position set such that the N bundles of fibers are equally arranged on the liner, θgM is a relative angle (0°≤θgM<360°) of one of the N guide members around the center axis to an origin (0°) when a position of another of the N guide members is set as the origin (0°), and M is a number assigned to each of the N guide members, M being an integer equal to or larger than one and equal to or smaller than N.

9. A filament winding design method comprising:

in a case where N bundles of fibers, which are supplied from N guide members are centered around a center axis of a liner having an elongate shape, the center axis extending in a longitudinal direction of the liner, each of the N guide members being configured to supply one bundle of fibers, and N being an integer equal to or larger than two, are helically wound by repeating a winding operation to helically wind N bundles of fibers supplied respectively from the N guide members around the liner at the same winding angle to form a reinforcing layer, the winding operation being an operation in which each of the N guide members travels, in a direction parallel to the center axis of the liner, from and back to a winding start position, and W being an integer equal to or larger than two, setting W such that W is the number of time of winding operation at a time when a group of numerical values n and a group of numerical values m calculated by a formula (1) to a formula (3) match each other in no particular order, $$n = L\{x\}, \text{ a function } L\{x\} \text{ is a function to take out a fractional portion of } x, \quad (1)$$

$$x = \theta gM/(360/W) \quad (2)$$

$$m = (M-1)/N, \text{ where} \quad (3)$$

n is a value indicating a first position of each of the bundles of fibers at a time when the N bundles of fibers are wound around the liner for W times, m is a value indicating a second position set such that the N bundles of fibers are equally arranged on the liner, θgM is a relative angle (0°≤θgM<360°) of one of the N guide members around the center axis to an origin (0°) when a position of another of the N guide members is set as the origin (0°), and M is a number assigned to each of the N guide members, M being an integer equal to or larger than one and equal to or smaller than N.

* * * * *